Feb. 20, 1968   M. B. UHRICH   3,369,645
ROTARY TABLE FEEDER

Filed Feb. 4, 1966

Feb. 20, 1968     M. B. UHRICH     3,369,645
ROTARY TABLE FEEDER

Filed Feb. 4, 1966     6 Sheets-Sheet 5

United States Patent Office 3,369,645
Patented Feb. 20, 1968

3,369,645
ROTARY TABLE FEEDER
Morris B. Uhrich, Lansdale, Pa., assignor to Link-Belt Company, a corporation of Illinois
Feb. 4, 1966, Ser. No. 525,199
4 Claims. (Cl. 198—54)

This invention relates to rotary table feeders which are designed for the handling of bulk quantities of a particulate material. The invention is particularly concerned with an improved, extremely rugged construction for rotatably supporting and facilitating the drive of the table of a rotary table feeder, as well as means for automatically removing particulate material from the surface of the rotating table and discharging the material onto a conveyor belt or other transporting means at a rate variable as desired.

The handling of bulk quantities of certain particulate materials, such as damp foundry sand and wood chips, has caused some difficulty due to the tendency of such materials to agglomerate or "arch" within conventional storage facilities which may take the form of cylindrical bins. Due to such agglomeration the particulate material does not flow freely from the storage facility under the influence of gravity, when it is desired to move the material from the storage location to a material processing station. The tendency of such material to agglomerate thus results in an uneven flow rate of material from the storage facility onto a material transporting means, such as a transfer chute or a conveyor belt. Uncontrolled variations in the flow rate of material are obviously undesirable from a material processing point of view.

In order to overcome this problem rotary table feeders have been developed for delivering agglomerating type particulate materials from the storage facility at a substantially uniform discharge rate onto a material transporting means. Such rotary table feeders basically comprise a rotatable table having a planar surface which is positioned below a large material discharge outlet in the bottom of a storage facility, such as a cylindrical bin. The particulate material passes through the discharge outlet directly onto the table surface. Rotation of the table moves the material to the edge of the table where it is removed at a selected radial position at a substantially uniform rate and deposited onto a material transporting means.

One of the problems encountered in the operation of rotary table feeders of this nature is the susceptibility of the table supporting means to frequent breakdowns due to the weight of the particulate material being handled resting along the edge of the table and the seemingly inevitable contamination of the rotary supporting means with particles of the material. Contamination significantly contributes to the breakdown susceptibility of the table supporting means due to the frequent clogging and jamming of the moving parts of the supporting means.

The rotary table feeder of the present invention seeks to overcome this problem by utilizing a means for rotatably supporting the table which is of an extremely rugged construction. The supporting means contacts the table solely at positions thereon removed from the center of table rotation and includes a large ring gear affixed to the undersurface of the table. The ring gear is rotatably supported on a base structure by a single large diameter bearing wherein one of the bearing races is formed directly on the ring gear. A pinion gear engages the ring gear and is connected to a suitable power means for rotatably driving the ring gear and the table connected thereto.

The ring and pinion gears are of a large and heavy construction, thus there is little danger that the contamination of these elements with particulate material will result in a breakdown of the apparatus. Furthermore, due to the large size of the ring and pinion gears driving the rotary table, the handling of large amounts of a heavy material, such as damp foundry sand, presents no problem in the operation of the feeder.

There is also provided a means for automatically removing material from the edge of the table at the desired rate for deposition onto a material transporting means. The material removing means includes a movable plow assembly which sweeps material from the surface of the rotating table onto the transporting means. The plow is pivotally connected to a non-rotating portion of the feeder and is moved automatically, by a power unit, across the surface of the table, with a swinging motion to sweep selected portions of material from the peripheral edge of the table surface to obtain the desired discharge rate.

With the foregoing considerations in mind, it is an object of the present invention to provide a rotary table feeder having a means for rotatably supporting the table thereof which is of a large and heavy construction having little or no tendency to be affected by contamination with the material being handled.

It is another object of the invention to provide a rotary table feeder which is extremely well adapted for handling large quantities of heavy particulate materials.

It is also an object of the invention to provide a rotary table feeder having movable plow means for automatically removing material from the surface of the table thereof at different desired rates.

The above and more specific objects of the present invention will be appreciated by reference to the specific description of a preferred embodiment of the invention given hereinafter. It is to be understood that the illustrated and described embodiment is not to be considered as limiting the scope of the invention, but rather only as illustrative of a structure incorporating the principles of the invention. The preferred embodiment of the invention will best be understood by reference to the following drawings in which.

Figure 1:
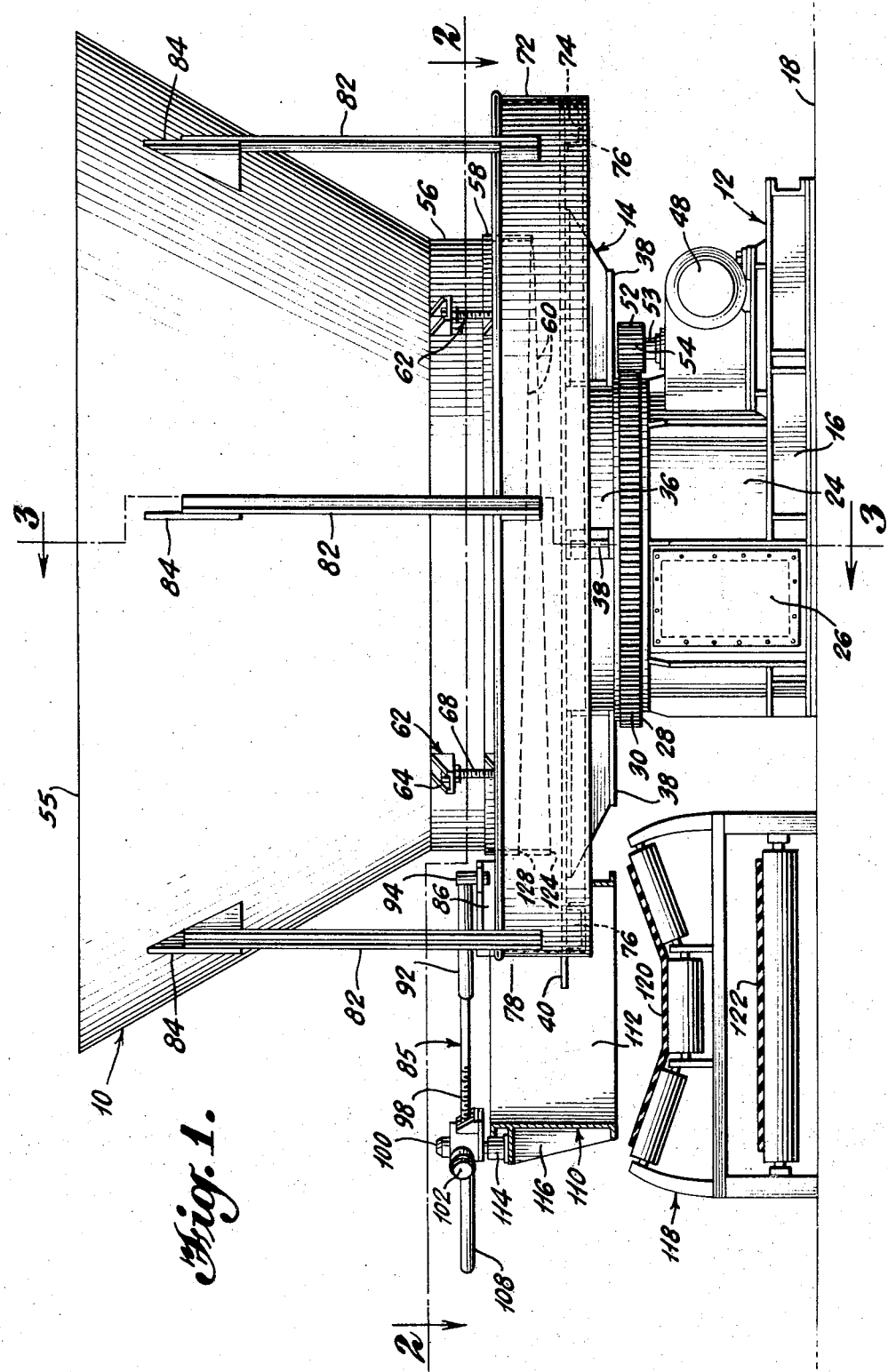
FIGURE 1 is a side elevational view of the rotary table feeder of the invention shown associated with a material storage hopper and a material removing conveyor belt.

Referring to the drawings, the rotary table feeder of the present invention is indicated generally by the numeral 10 on FIG. 1. The table feeder 10 has a base 12, which includes means for rotatably supporting and driving a material transfer table 14.

Figure 3:
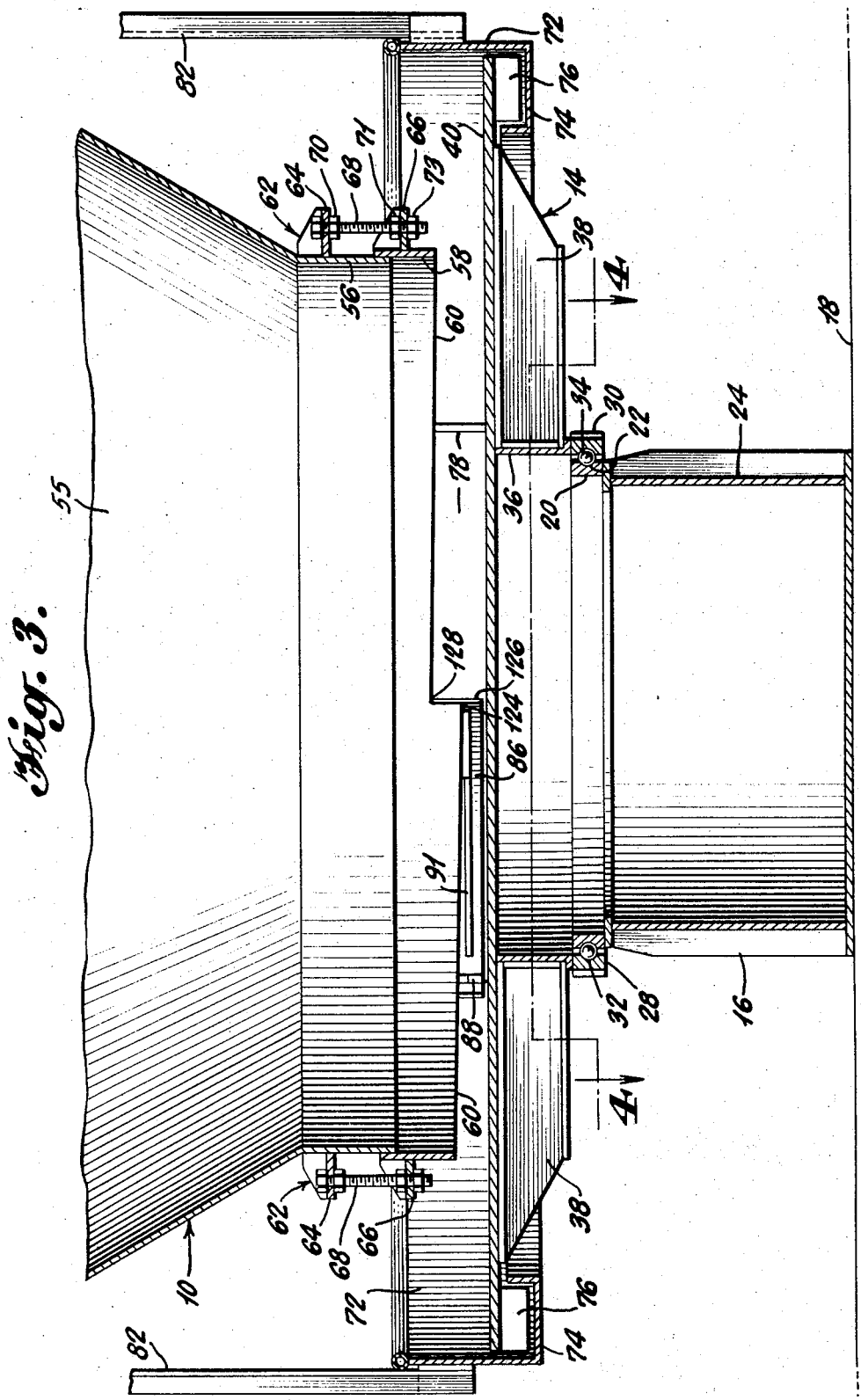
FIGURE 3 is a sectional view taken on line 3—3 of FIGURE 1, showing in particular the rotatable support for the table of the rotary table feeder.
Figure 4:
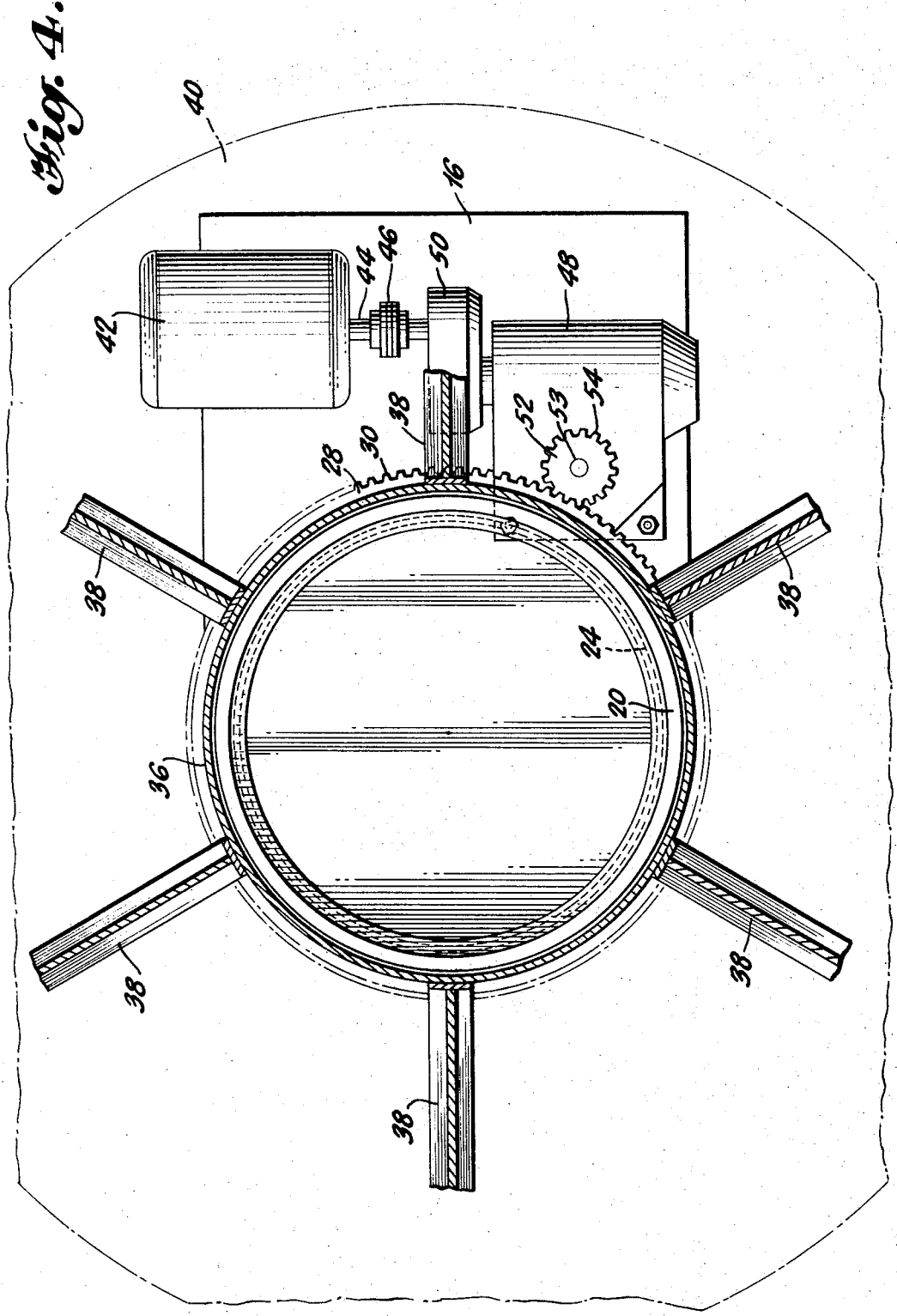
FIGURE 4 is a cross-sectional view taken on line 4—4 of FIGURE 3, showing in particular the driving means for rotating the table.

The base 12 comprises a metal framework assembly 16, the bottom portion of which is secured to a foundation structure 18 of suitable load-carrying material. Connected to the upper portion of framework assembly 16 is an annular ring 20 having a bearing race 22 formed on the radially outer surface thereof, as best seen in FIG. 3. The portion of base 12 below annular ring 20 is enclosed by suitable means such as sheet metal panels 24 affixed to the upright portions of framework assembly 16. An access port having a sheet metal cover 26 is provided, to permit access within that portion of base 12 enclosed by panels 24.

The means for rotatably supporting table 14 includes a large diameter ring gear 28 positioned concentrically about annular ring 20. Ring gear 28 has a series of gear teeth 30 formed on the outer surface thereof, and an annular bearing race 32 formed on the radially inner surface thereof. Bearings 34 are cooperatively held between annular ring 20 and ring gear 28 by bearing races 22 and 32, respectively such that ring gear 28 is supported on and rotatable relative to the base 12.

Table 14 is affixed to ring gear 28 by annular supporting cylinder 36, which is secured between the upper surface of ring gear 28 and the lower surface of planar table portion 404. The table 14 also includes circumferentially spaced radial stringers 38 affixed to the underside of planar table portion 40 for strengthening the table, and specifically for resisting deformation of planar table portion 40 when heavy loads of particulate material are carried on the peripheral edge thereof. Stringers 38 are connected at their inner ends to supporting cylinder 36, and extend radially outwardly therefrom to a position adjacent the peripheral extremity of planar table portion 40. If desired, stringers 38 may be extended radially inwardly from the innersurface of supporting cylinder 36 to provide additional support for the central section of planar table portion 40.

From the foregoing description, it will be apparent that the table supporting means, including ring gear 28 and supporting cylinder 36, contact table 14 solely at positions thereon spaced from the center of table rotation to give high stability against tilting of the table when material loads are remote from the table center.

The means for rotatably driving table 14 is also mounted on framework assembly 16 of base 12. The driving means include a torque-producing power means, such as electric motor 42, which is connected by a drive shaft 44 and a coupling 46, to a speed reducer assembly 48 through an input unit 50. A pinion gear 52 is connected to the output shaft 53 of speed reducer assembly 48. Pinion gear 52 has gear teeth 54 formed thereon which engage and mesh with gear teeth 30 of ring gear 28. Upon energization of motor 42 rotary movement is transmitted through speed reducer assembly 48 to pinion gear 52. As pinion gear 52 is turned, ring gear 28 engaged therewith is rotatably driven, which in turn directly imparts rotation to table 14 by way of supporting cylinder 36.

A storage means is provided above table 14 for holding a supply of particulate material to be discharged onto the upper surface of the planar table portion 40 of table 14. The storage means includes a conical bin 55 which retains a supply of particulate material therein. This bin may be suitably supported by means (not shown) to dispose the bin outlet above rotary table feeder 10. Affixed to the lower portion of bin 55 is a cylindrical bin collar 56 having a material outlet opening in the lower end thereof, for discharging particulate material onto the upper surface of planar table portion 40.

Interposed between the lower portion of bin collar 56 and the upper surface of planar table portion 40 is a feed collar 58. The upper portion of feed collar 58 concentrically surrounds the lower end of cylindrical bin collar 56. The lower edge 60 of feed collar 58 is shaped in the form of a helical curve for the purpose described in detail hereinafter.

Feed collar 58 is connected to bin collar 56 by adjustable means 62, which permit feed collar 58 to be raised or lowered with respect to the upper surface of planar table portion 40. Adjustable means 62 comprises circumferentially spaced flanges 64 affixed to the outer surface of bin collar 56 and vertically aligned opposing flanges 66 affixed to the outer surface of feed collar 58. Threaded bolts 68 are passed through the respective flanges 64 and 66, and are secured to the flanges by a plurality of lock nuts 70, 71 and 73. By adjusting the position of lock nuts 71 and 73 on bolts 68, flanges 66 affixed to feed collar 58 may be raised or lowered with respect to flanges 64 affixed to bin collar 56. The distance between helically curved edge 60 of feed collar 58 and the upper surface of planar table portion 40 may thus be regulated by raising or lowering flanges 66 upon appropriate adjustment of the lock nuts 71 and 73.

After particulate material passes from bin 55, through bin collar 56 and feed collar 58, onto the upper surface of planar table portion 40, it spreads radially outwardly toward the peripheral edge of the table incident rotation of the table 14. The particulate material thus passes between the upper surface of planar table portion 40 and the lower helically curved edge 60 of feed collar 58 as it moves to the table edge. The rate at which material is permitted to pass between table portion 40 and the edge 60 is controlled by adjustment of the vertical distance therebetween. An increase in the distance between table portion 40 and feed collar edge 60 results in an increase in the feed rate of particulate material to the peripheral edge of table 14.

A retaining means is provided adjacent the peripheral edge of the table 14 to prevent particulate material from indiscriminately falling off the table edge. The retaining means includes a feed ring 72 which surrounds the peripheral edge of table portion 40. The feed ring 72 extends above the surface of planar table portion 40 a sufficient distance to retain an accumulation of particulate material on the edge thereof. The lower portion of feed ring 72 extends downwardly below the lower surface of planar table portion 40, and is turned radially inwardly thereunder and then upwardly to form an annular upwardly facing channel 74.

A small amount of particulate material may fall into channel 74 by passing between the peripheral edge of table portion 40 and the inside surface of feed ring 72. To remove such material, blades 76 affixed at circumferentially spaced locations on the lower surface of planar table portion 40 at the peripheral edge thereof are positioned to move around within channel 74. Blades 76 sweep any particulate material which may fall into channel member 74, through the channel member to the opening 78 in feed ring 72, where the material is discharged. The major portion of the particulate material, however, remains on the upper surface of table portion 40 until it is removed from the surface of the table through opening 78 as will be described.

The feed ring 72 is suspended on struts 82 connected to the outside of feed ring 72. These struts extend upwardly from feed ring 72 and are attached to flanges 84 secured to the exterior of bin 55.

There is provided at the opening 78 in feed ring 72, means 85 for removing particulate material from the upper surface of planar table portion 40. Material removing means 85 includes a movable plow 86 which is pivotally connected to feed ring 72 at one edge of the opening 78 therein, by vertical hinge connection 88. The lower edge of plow 86 is positioned slightly above the upper surface of planar table portion 40, to provide a small amount of clearance therebetween.

Braces 90 and 91 are affixed to the rear side of plow 86 to strengthen the plow structure. A plow actuating arm 92 is pivotally connected to plow brace 90 by bushing 94, integral with the inner end of arm 92, and pivot pin 96.

The outer end of arm 92 includes an integral threaded rod portion 98 which is received in motorized plow operator assembly 100. Plow operator assembly 100 includes a reversible electric drive motor 102 which is connected to a suitable driven nut actuator, shown schematically at 104, that engages threaded rod portion 98. Power driven nut actuators are well known, and it is believed that a detailed description thereof is unnecessary for a complete understanding of the present invention. A manually adjustable control handle 106 is also operably connected to nut actuator 104 to permit manual adjustment of threaded rod portion 98. Hollow pipe section 108 is connected to the side of operator assembly 100 for receiving threaded rod portion 98 when it is retracted by nut actuator 104.

The positioning of plow 86 to determine the rate of material removal from table 14 can be automatically carried out by energizing motor 102 as needed to swing the plow to one position or another. Upon energization of motor 102, power nut actuator 104 begins to rotate, and thus causes rod portion 98 to be displaced. As rod portion 98 moves toward operator assembly 100, actuating arm 92, of which rod portion 98 is an integral part, also moves toward operator assembly 100, pivoting the plow 86 about hinge connection 88, to thus move the plow across the upper surface of planar table portion 40. At each different position of plow 86 relative to the surface of table portion 40, particulate material is swept off the table surface and through opening 78 in retaining ring 72 at a different rate. When plow 86 has reached the material discharge position, shown in dotted lines on FIG. 5, no material will be swept from table portion 40. In the solid line position shown on FIG. 5 the maximum amount of material, for the particular table rotary speed and position of feed collar 58, will be swept from the table portion 40 through feed ring opening 78.

Figure 6:
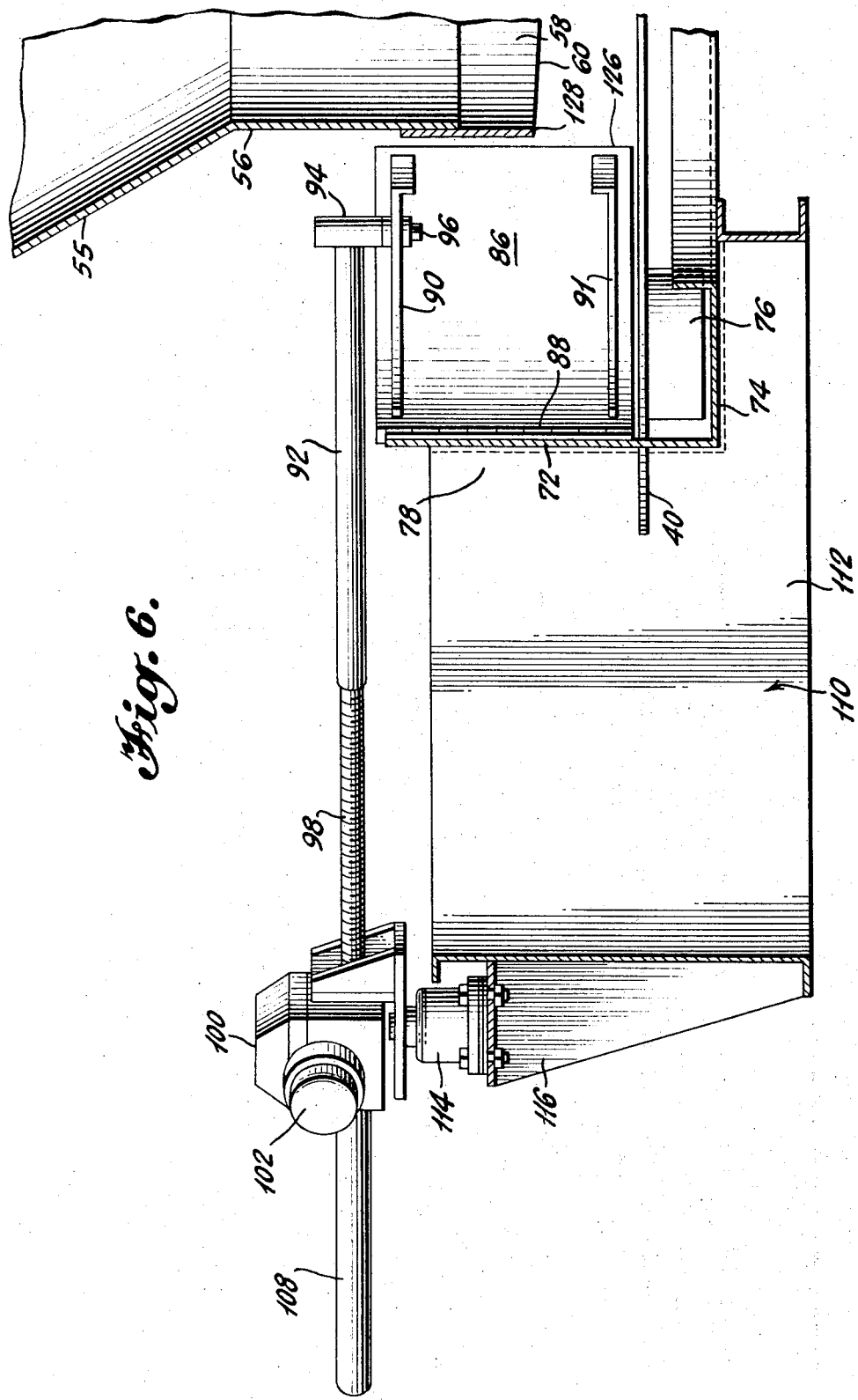
FIGURE 6 is a sectional view taken on line 6—6 of FIGURE 5.

The operator assembly 100 is pivotally supported on a discharge box 110 which encloses opening 78 in feed ring 72. Box 110 is open at the top and bottom to permit particulate material to pass therethrough after leaving the edge of table portion 40. The box 110 includes sides 112 which abut the outside surface of feed ring 72, and extend below the feed ring and under table portion 40 to also receive material cleared from channel 74, as best seen in FIG. 6. Operator assembly 100 is pivotally connected to box 110 by pivot assembly 114 which is fastened to supporting bracket 116 in turn affixed to the outside surface of box 110.

Box 110 is positioned above a material transporting means, such as troughed belt conveyor 118, having a delivery run 120 and a return run 122. Conveyor 118 may transfer the particulate material from table feeder 10 to a material processing station as desired.

Figure 2:
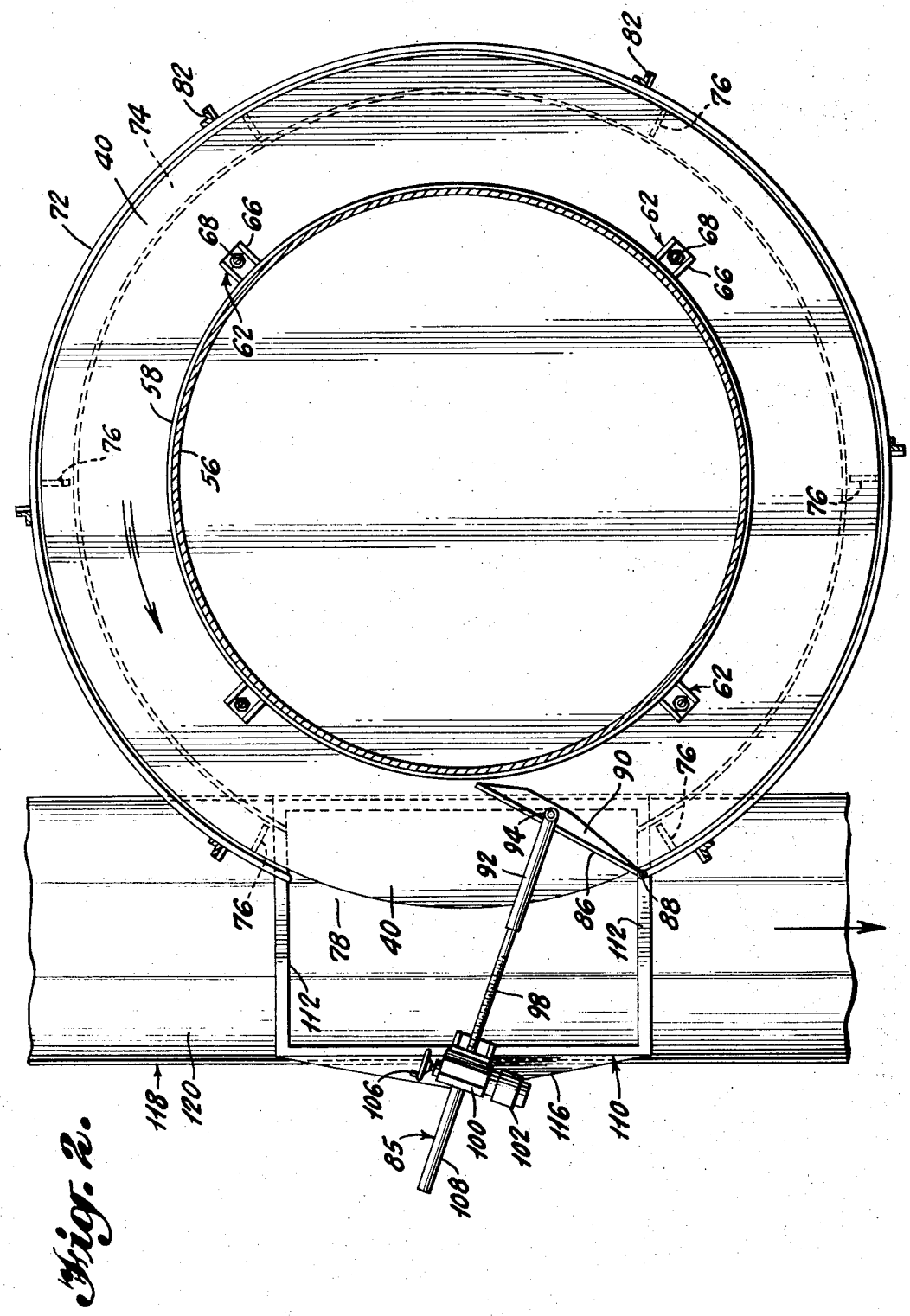
FIGURE 2 is a sectional view taken on line 2—2 of FIGURE 1.
Figure 5:
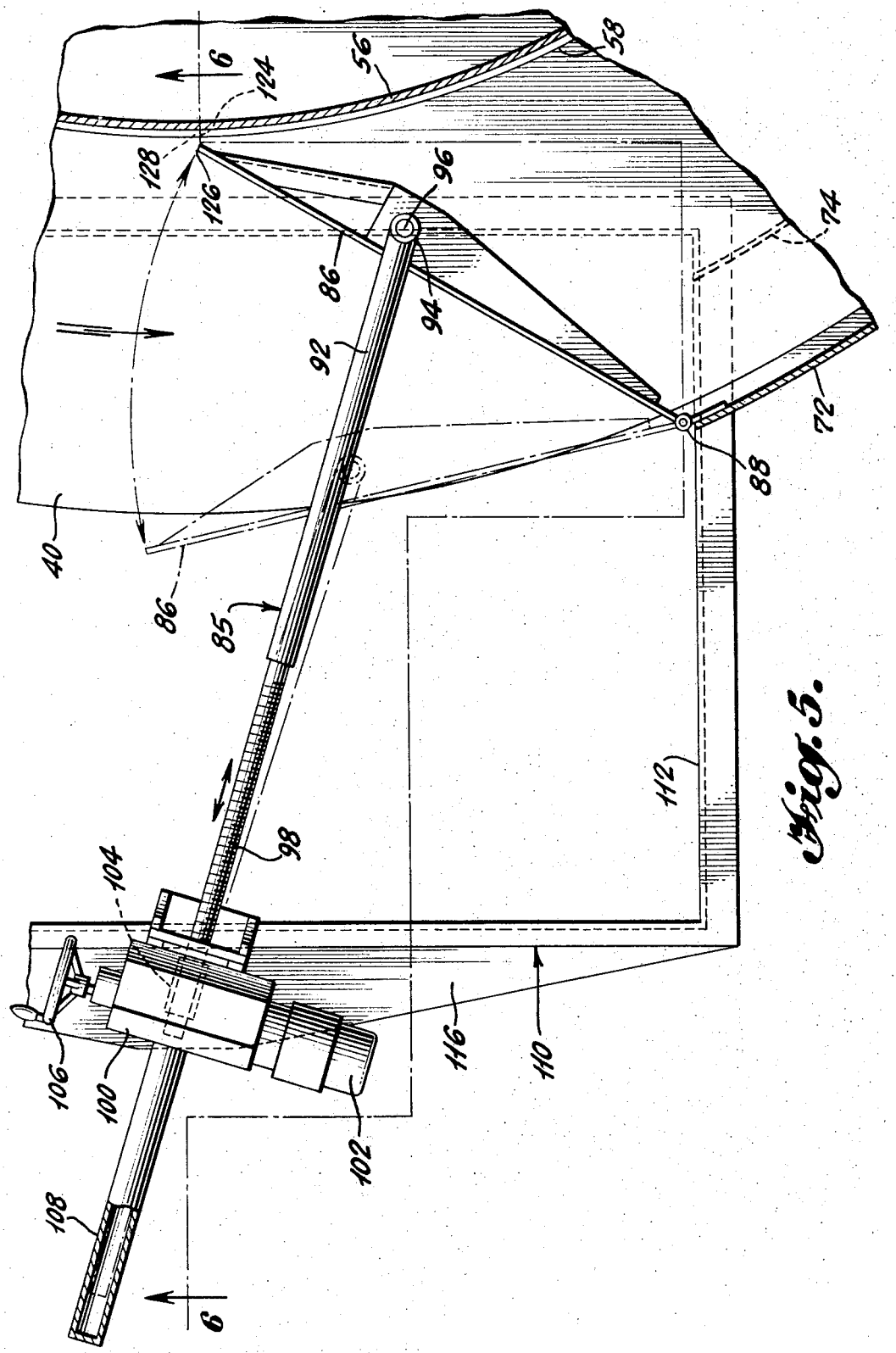
FIGURE 5 is a plan view of a portion of the rotary table feeder and in particular of the plow means for automatically removing material from the surface of the table.

As mentioned hereinbefore, lower edge 60 of feed collar 58 is helically shaped. The lowest point 124 of helically curved edge 60 is positioned adjacent the maximum material receiving position of displaceable vertical edge 126 of plow 86, as shown in FIGS. 5 and 6. Moving from point 124, around the circumference of feed collar 58 in a counterclockwise direction, the vertical distance between table portion 40 and helically curved edge 60 increases until the highest point 128 of curved edge 60 is reached directly in front of plow edge 126. This structural arrangement cooperates with table 14, which rotates in a counterclockwise direction, as shown by the arrows in FIGS. 2 and 5, to produce a substantially uniform rate of material flow under feed collar 58, across the surface of table portion 40, and discharge from the table portion 40 into box 110.

It is apparent that table 14 might be rotated in the clockwise direction, should such be desirable for a particular installation. In that case, the direction of the helically curved portion 60 would be reversed on feed collar 58 and plow 86 would be pivotally connected to the other side of that portion of feed ring 72 which defines opening 78. Also in such instance, conveyor 118 would preferably be moving in the opposite direction.

While the invention has been described in connection with a particular embodiment it will be understood that it is not limited to the exact construction shown and described, but that various changes and modifications may be made without departing from the scope and spirit of the invention as defined in the appended claims.

I claim:
1. A rotary table feeder comprising:
a base;
a table for receiving particulate material from a storage supply mounted thereabove;
means connected to said table for rotatably supporting the table on said base including a large diameter ring gear affixed to the table concentric with the axis of table rotation with the ring gear teeth substantially spaced from said axis, a first bearing race on said ring gear, a second bearing race on said base, said second bearing race being adjacent and facing said first bearing race, and a plurality of bearings disposed between said first and second bearing races, said table being rotatably supported on said base for rotation with respect thereto solely by said plurality of bearings cooperatively held between said first and second bearing races;
driving means engaging said ring gear teeth for rotating said table at a selected substantially constant velocity to move the material to the edge of said table;
retaining means adjacent the table for preventing particulate material from being discharged from the edge thereof, said retaining means having a discharge opening provided therein; and
means cooperatively associated with said retaining means for removing material from said table through said discharge opening.
2. The rotary table feeder as recited in claim 1 wherein said driving means comprises:
a pinion gear engaging said ring gear; and
power means operatively connected to said pinion gear for rotating the pinion gear and thereby rotatably driving said ring gear and said table.
3. A rotary table feeder as recited in claim 1 wherein said material removing means comprises:
a movable plow positioned adjacent the surface of the table; and
means for adjustably moving said plow to sweep selected portions of particulate material from said table.
4. The rotary table feeder as recited in claim 1 further comprising:
a bin mounted above said table and having a material discharge opening;
a feed collar interposed between said bin and said table, said feed collar having an edge thereof nearest the table defining a helical curve; and
adjustable means adjacent the material discharge opening in said bin for connecting said feed collar to said bin and regulating the distance between the helically curved collar portion and the table to thus control the feed rate of particulate material onto said table.

References Cited

UNITED STATES PATENTS 449,595  3/1891  Smith _____ 198—210

FOREIGN PATENTS 284,082  1/1928  Great Britain.
875,698  8/1961  Great Britain.

RICHARD E. AEGERTER, *Primary Examiner.*

EVON C. BLUNK, *Examiner.*